(12) United States Patent
Kurokawa et al.

(10) Patent No.: US 12,587,042 B2
(45) Date of Patent: Mar. 24, 2026

(54) WIRELESS POWER TRANSMISSION SYSTEM AND WIRELESS POWER TRANSMISSION METHOD WITH POWER WAVE-BASED ADJUSTMENT MODE

(71) Applicant: Panasonic Holdings Corporation, Osaka (JP)

(72) Inventors: Aya Kurokawa, Osaka (JP); Hiroyuki Tani, Hyogo (JP); Yuki Tanaka, Tokyo (JP)

(73) Assignee: Panasonic Holdings Corporation, Osaka (JP)

( * ) Notice: Subject to any disclaimer, the term of this patent is extended or adjusted under 35 U.S.C. 154(b) by 933 days.

(21) Appl. No.: 17/660,043

(22) Filed: Apr. 21, 2022

(65) Prior Publication Data

US 2022/0352764 A1 Nov. 3, 2022

(30) Foreign Application Priority Data

Apr. 30, 2021 (JP) ................................. 2021-077582

(51) Int. Cl.
*H02J 50/90* (2016.01)
*H02J 50/20* (2016.01)

(52) U.S. Cl.
CPC .............. *H02J 50/90* (2016.02); *H02J 50/20* (2016.02)

(58) Field of Classification Search
CPC ...................................................... H02J 50/90
See application file for complete search history.

(56) References Cited

U.S. PATENT DOCUMENTS

| | | | | |
|---|---|---|---|---|
| 10,516,302 B2 * | 12/2019 | Lee | .......................... | H02J 50/20 |
| 11,502,729 B1 * | 11/2022 | Georgeson | .............. | H02J 50/80 |
| 2009/0146503 A1 | 6/2009 | Kawabata | | |
| 2010/0177000 A1 * | 7/2010 | Brisebois | ............. | H01Q 1/1257 |
| | | | | 343/703 |
| 2010/0222010 A1 | 9/2010 | Ozaki et al. | | |
| 2010/0259447 A1 * | 10/2010 | Crouch | ................... | H02J 50/23 |
| | | | | 342/374 |

(Continued)

FOREIGN PATENT DOCUMENTS

| | | |
|---|---|---|
| JP | H02-062989 A | 3/1990 |
| JP | 2005-198077 A | 7/2005 |

(Continued)

*Primary Examiner* — Adi Amrany
(74) *Attorney, Agent, or Firm* — McDonald Hopkins LLC

(57) ABSTRACT

A wireless power transmission system and a wireless power transmission method are provided that, even if a power transmitter does not have a communication functionality, can improve a transmission efficiency of power waves transmitted from the power transmitter. The wireless power transmission system includes a power transmitter that transmits a power wave and one or more power receivers that receive the power wave, wherein the power transmitter includes a controller that measures a strength of a power wave transmitted from the power receivers by adjusting at least one of a position of the power transmitter and an orientation of an antenna receiving the power wave transmitted from the power receivers and transmits a power wave to the power receivers in accordance with at least one of the position of the power transmitter and the orientation of the antenna upon the measured strength of the power wave exceeding a predetermined value.

17 Claims, 8 Drawing Sheets

100

(56) References Cited

U.S. PATENT DOCUMENTS

| | | | | |
|---|---|---|---|---|
| 2012/0050118 A1* | 3/2012 | Teshirogi | G01R 29/10 | |
| | | | | 343/703 |
| 2012/0142286 A1 | 6/2012 | Mitomo et al. | | |
| 2017/0141621 A1* | 5/2017 | Zeine | H02J 50/402 | |
| 2018/0054086 A1* | 2/2018 | Jung | H02J 50/90 | |
| 2018/0115182 A1* | 4/2018 | Yamauchi | H04B 5/79 | |
| 2018/0302138 A1* | 10/2018 | Shirakata | H04B 17/23 | |
| 2019/0157916 A1 | 5/2019 | Takemoto et al. | | |
| 2019/0252925 A1* | 8/2019 | Zeine | H10D 86/441 | |
| 2019/0363758 A1* | 11/2019 | Shichino | G06K 19/077 | |
| 2020/0259375 A1* | 8/2020 | Hemphill | B60L 53/38 | |
| 2021/0336492 A1* | 10/2021 | Chu | H02J 7/0047 | |
| 2021/0351631 A1* | 11/2021 | Park | H02J 50/12 | |
| 2021/0393968 A1* | 12/2021 | Monson | H02J 50/001 | |
| 2022/0052560 A1* | 2/2022 | Zeine | H02J 50/402 | |
| 2023/0147179 A1* | 5/2023 | Sawa | H02J 50/20 | |
| | | | | 307/104 |

FOREIGN PATENT DOCUMENTS

| | | | |
|---|---|---|---|
| JP | 2007-267110 A | 10/2007 |
| JP | 2009-524399 A | 6/2009 |
| JP | 2009-302939 A | 12/2009 |
| JP | 2012-518337 A | 8/2012 |
| JP | 2016-082381 A | 5/2016 |
| JP | 2019-097303 A | 6/2019 |
| WO | 2007/084717 A2 | 7/2007 |
| WO | 2010-093965 A2 | 8/2010 |
| WO | 2011-033659 A1 | 3/2011 |

* cited by examiner

100

WIRELESS POWER TRANSMISSION SYSTEM AND WIRELESS POWER TRANSMISSION METHOD WITH POWER WAVE-BASED ADJUSTMENT MODE

CROSS REFERENCE TO RELATED APPLICATIONS

This application is entitled and claims the benefit of Japanese Patent Application No. 2021-077582, filed on Apr. 30, 2021, the disclosure of which including the specification, drawings and abstract is incorporated herein by reference in its entirety.

TECHNICAL FIELD

The present disclosure relates to a wireless power transmission system and a wireless power transmission method.

BACKGROUND ART

Japanese Patent Application Laid-Open No. 2016-082381 discloses a technique where a base station having a communication functionality with a wireless terminal controls the directivity of an antenna to satisfy a predetermined transmission strength in order to improve a transmission efficiency of power transmitted from the base station to the wireless terminal.

The base station having the communication functionality as disclosed in Japanese Patent Application Laid-Open No. 2016-082381 receives an uplink signal transmitted from the wireless terminal by means of the communication functionality and identifies a direction to minimize the transmission loss toward the wireless terminal based on the reception strength of the uplink signal. In addition, the base station sets the transmission strength of an electric wave toward the direction based on a value calculated by adding a predetermined SNR (Signal to Noise Ratio) to the identified propagation loss, and controls the directivity of the antenna provided to the base station based on the set transmission strength.

SUMMARY OF INVENTION

Technical Problem

In the existing technique of Japanese Patent Application Laid-Open No. 2016-082381, however, the base station serving as a power transmitter must have the communication functionality, and accordingly if the power transmitter does not have the communication functionality, there is a problem where a demand to improve the transmission efficiency of power waves transmitted from the power transmitter cannot be achieved.

Non-limiting embodiments of the present disclosure provide a wireless power transmission system and a wireless power transmission method that can improve the transmission efficiency of power waves transmitted from the power transmitter even if the power transmitter does not have the communication functionality.

Solution to Problem

A wireless power transmission system according to one embodiment of the present disclosure includes a power transmitter that transmits a power wave, and one or more power receivers that receive the power wave, and the power transmitter includes a controller that measures a strength of a power wave transmitted from the power receivers by adjusting at least one of a position of the power transmitter and an orientation of an antenna receiving the power wave transmitted from the power receivers and transmits a power wave to the power receivers in accordance with at least one of the position of the power transmitter and the orientation of the antenna upon the measured strength of the power wave exceeding a predetermined value.

A wireless power transmission method according to one embodiment of the present disclosure includes upon receiving a power wave transmitted from one or more power receivers, measuring, by a power transmitter, a strength of the power wave transmitted from the power receivers by adjusting at least one of a position of the power transmitter and an orientation of an antenna receiving the power wave transmitted from the power receivers, and upon measuring the strength of the power wave, transmitting, by the power transmitter, a power wave to the power receivers in accordance with at least one of the position of the power transmitter and the orientation of the antenna upon the measured strength of the power wave exceeding a predetermined value.

Advantageous Effects of Invention

According to one embodiment of the present disclosure, the wireless power transmission system and the wireless power transmission method that can improve the transmission efficiency of power waves transmitted from the power transmitter even if the power transmitter does not have the communication functionality can be provided.

Further advantages and effects in an embodiment of the present disclosure will be apparent from the specification and drawings. While such advantages and/or effects are respectively provided by the features described in the several embodiments, the specification and drawings, there is no need of proving all of them to obtain one or more of the same features.

DESCRIPTION OF EMBODIMENTS

Figure 1:
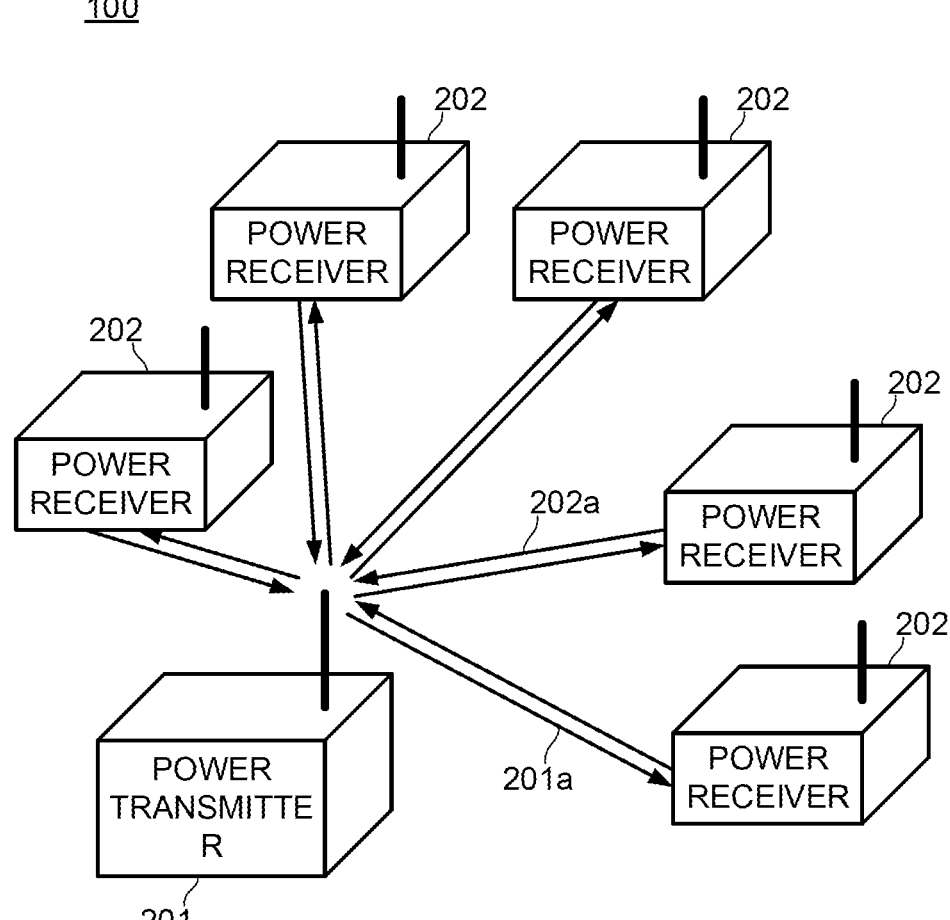
FIG. 1 is a diagram for illustrating an exemplary arrangement of a wireless power transmission system 100 according to an embodiment of the present disclosure.

Preferred embodiments of the present disclosure will be described in detail with reference to the accompanying drawings. In the present specification and drawings, components having substantially the same functionalities are denoted by the same reference numerals, and the description thereof is not repeated.

Embodiments

First, a background of motivating creation of embodiments according to the present disclosure is described.

Japanese Patent Application Laid-Open No. 2016-082381 discloses a technique for improving a transmission efficiency of power that a base station having a communication functionality with a wireless terminal transmits to the wireless terminal through controlling the directivity of an antenna to satisfy a predetermined transmission strength.

The base station having the communication functionality as disclosed in Japanese Patent Application Laid-Open No. 2016-082381 receives an uplink signal transmitted from the wireless terminal by means of the communication functionality and identifies the direction to minimize a transmission loss for the wireless terminal based on the reception strength of the uplink signal. Furthermore, the base station sets a transmission strength of electric waves toward the direction based on a value calculated by adding a predetermined SNR (Signal to Noise Ratio) to the identified propagation loss, and controls the directivity of an antenna provided in the base station based on the set transmission strength.

In the existing technique of Japanese Patent Application Laid-Open No. 2016-082381, however, the base station serving as a power transmitter is required to have the communication functionality, and if the power transmitter does not have the communication functionality, there is a problem where a demand to improve the transmission efficiency of power waves transmitted from the power transmitter cannot be achieved.

Accordingly, it is desired to improve the transmission efficiency of power waves transmitted from the power transmitter even if the power transmitter does not have the communication functionality. In the following, embodiments according to the present disclosure are described.
(Exemplary Arrangement of Wireless Power Transmission System 100)

FIG. 1 is a diagram for illustrating an exemplary arrangement of a wireless power transmission system 100 according to an embodiment of the present disclosure. The wireless power transmission system 100 includes a power transmitter 201 that transmits a power wave 201a to a plurality of power receivers 202 and the plurality of receivers 202 that each receives the power wave 201a. The wireless power transmission system 100 has a power transmission mode and an adjustment mode.

Note that the wireless power transmission system 100 may include a single power receiver 202 instead of the plurality of power receivers 202.
(Power Transmission Mode)

The power transmission mode is a mode where the power wave 201a is transmitted from the power transmitter 201 to the power receivers 202. In the power transmission mode, for example, upon receiving the power wave 201a, the one or more power receivers 202 may supply power to a load (not illustrated). The load may be a sensor for use in IoT (Internet of Things), for example.
(Adjustment Mode)

The adjustment mode is a mode where the position of the power transmitter 201 and the transmission direction of power waves emitted from the power transmitter 201 are adjusted to enhance the transmission efficiency of the power wave 201a transmitted from the power transmitter 201 to the one or more power receivers 202.

In the adjustment mode, the power wave 202a emitted from the power receiver 202 is received at the power transmitter 201, and the power transmitter 201 measures the strength of the power wave 202a. The power transmitter 201 adjusts the position of the power transmitter 201 and the transmission direction of the power wave 201a so as to increase the measured strength of the power wave 202a. Note that some methods for adjusting the position of the power transmitter 201 and the transmission direction of the power wave 201a are described in detail below.
(Power Transmitter 201)

Figure 2:
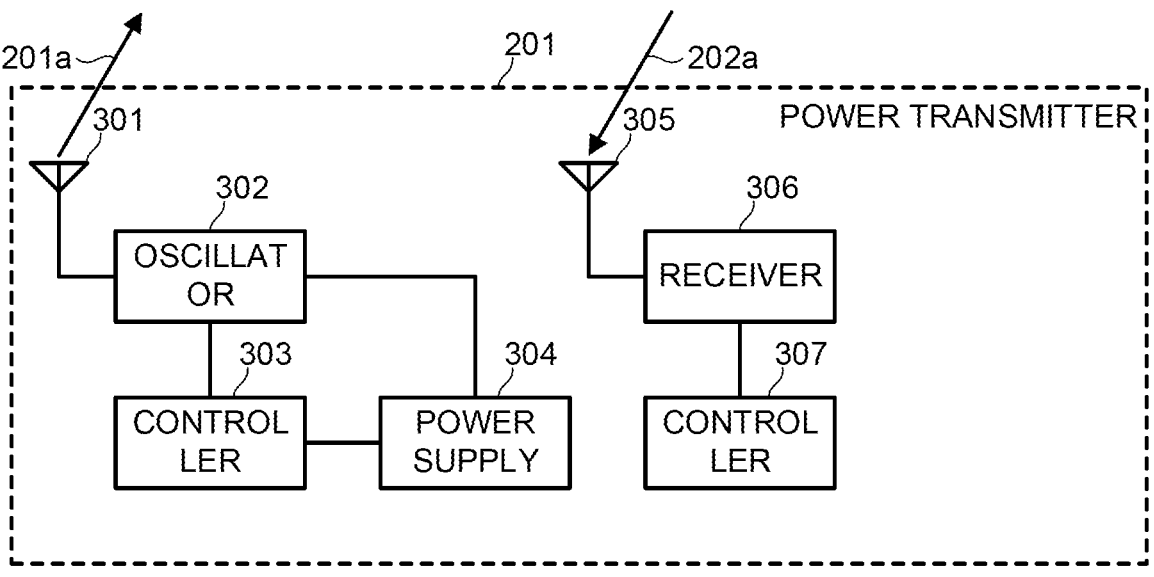
FIG. 2 is a diagram for illustrating an exemplary arrangement of a power transmitter 201.

Next, an exemplary arrangement of the power transmitter 201 is described with reference to FIG. 2. FIG. 2 is a diagram for illustrating an exemplary arrangement of the power transmitter 201.

The power transmitter 201 includes an antenna 301, an oscillator 302, a controller 303, a power supply 304, an antenna 305, a receiver 306 and a controller 307.
(Antenna 301)

In the power transmission mode, the antenna 301 emits high-frequency power generated at the oscillator 302 as the power wave 201a.

The antenna 301 may be a directional antenna, a non-directional antenna or an omnidirectional antenna, for example. The directional antenna may be used for long distance transmission of power in a certain direction, and the non-directional or omnidirectional antenna may be used for short distance transmission of power toward a relatively wide range.

For example, a planar patch antenna that sandwiches a dielectric substrate between a GND plate and an antenna may be used as the directional antenna. On the other hand, a dipole antenna or a monopole antenna having a linear shape where wires flowing an electricity is elongated linearly may be used as the non-directional or omnidirectional antenna.
(Oscillator 302)

The oscillator 302 may include an electric circuitry composed of a quartz oscillator, a phase-locked loop, an amplifier and so on, and use the electric circuitry to generate high-frequency power. The frequency band of the high-frequency power may be a microwave band such as a 900 MHz band, a 2.45 GHz band or a 5.8 GHz band, for example. These frequency bands may be selected depending on the distance from the power transmitter 201 to the power receivers 202 as illustrated in FIG. 1, the size of the power transmitter 201 or the like.
(Controller 303)

For example, the controller 303 may include an electric circuitry such as a memory, a CPU (Central Processing Unit) and a communication device, and use the electric circuitry to control an amount of the transmitted high-frequency power, switch between frequency bands of the high-frequency power during the power transmission mode or the like.
(Power Supply 304)

For example, the power supply 304 may include a power conversion circuitry to generate direct current power based on commercial alternating power, and use the power conversion circuitry to supply power for operating the power transmitter 201.
(Antenna 305)

In the adjustment mode, the antenna 305 may receive the power wave 202a transmitted from the power receiver 202 as illustrated in FIG. 1 and deliver it as the high-frequency power to the receiver 306. The antenna 305 may be a directional antenna, a non-directional antenna or an omni-directional antenna, for example.

(Receiver 306)

For example, the receiver 306 may include a circuitry such as an impedance matching circuitry or a filter circuitry, and use the circuitry to match the impedance of the antenna 305 with the impedance of the controller 307. Also, the receiver 306 removes a noise from the high-frequency power transmitted from the antenna 305 and delivers the noise-free high-frequency power to the controller 307.

(Controller 307)

The controller 307 may be an electric circuitry such as a memory, a CPU or a communication device, for example. In the adjustment mode, the controller 307 measures the strength of the power wave 202a based on the high-frequency power delivered from the receiver 306.

(First Adjustment Method)

In the adjustment mode, the controller 307 may measure one or more local maximum points of the strength of the power wave 202a exceeding a predetermined value while moving the power transmitter 201 from a predetermined point a to a predetermined point b.

The power transmitter 201 may be moved through the controller 307 controlling a three-axis stage (not illustrated), for example. The movement speed, the movement amount or the like of the power transmitter 201 with the three-axis stage may be set arbitrarily.

If the local maximum points of the strength of the power wave 202a exceeding the predetermined value are detected during movement of the power transmitter 201, the controller 307 may number the respective local maximum points in the order closer to a reception time instance of the power wave 202a as "1", "2" and so on. These numbers may be attached for identification of the traveling position of the power transmitter 201.

The controller 307 may associate data indicative of the position of the power transmitter 201 on the three-axis stage at the numbering occasions and data indicative of the strength of the power wave 202a with the numbers and transmits the association information to the controller 303. Note that the data indicative of the position of the power transmitter 201 may be calculated based on a PWN signal of a motor that drives the three-axis stage under PWN control, for example.

(During Power Transmission Mode)

In the power transmission mode, upon receiving the association information from the controller 307, the controller 303 may set the position of the power transmitter 201 at the highest strength among the local maximum points of the strength of the power wave 202a exceeding the predetermined value based on the association information.

After that, the controller 303 may control the motor of the three-axis stage to move the position of the power transmitter 201 to the set position as stated above and then control the oscillator 302 to emit the power wave 201a.

In this manner, even if the power transmitter 201 does not have a wireless communication functionality with the power receiver 202, the transmission efficiency of the power wave 201a transmitted from the power transmitter 201 to the power receivers 202 can be improved.

(Second Adjustment Method)

In the adjustment mode, the controller 307 may measure the local maximum points of the strength of the power wave 202a exceeding a predetermined value while changing the orientation of the antenna 305, instead of moving the power transmitter 201, for example.

In this case, for example, the controller 307 may control a ball mechanism (not illustrated) to change the orientation of the antenna 305. The rotational direction, the rotational amount or the like of the antenna 305 can be set arbitrarily by means of the ball mechanism.

If the local maximum points of the strength of the power wave 202a exceeding the predetermined value are detected in changing the orientation of the antenna 305, the controller 307 may number the respective local maximum points in the order closer to a reception time instance of the power wave 202a as "1", "2" and so on. These numbers may be attached for identification of the orientation of the antenna 305.

The controller 307 may associate data indicative of the orientation of the antenna 305 at the numbering occasions and data indicative of the strength of the power wave 202a with the numbers, and transmit the association information to the controller 303. The data indicative of the orientation of the antenna 305 may be calculated based on a PWM signal of a motor that drives the ball mechanism under PWM control, for example.

(During Power Transmission Mode)

In the power transmission mode, upon receiving the association information, the controller 303 may set the orientation of the antenna 301 at the highest strength among the local maximum points of the power wave 202a exceeding a predetermined value based on the association information.

After that, the controller 303 may control the motor of the ball mechanism to adjust the orientation of the antenna 301 to the set orientation as stated above and then control the oscillator 302 to emit the power wave 201a.

In this manner, even if the power transmitter 201 does not have a wireless communication functionality with the power receiver 202, the transmission efficiency of the power wave 201a transmitted from the power transmitter 201 to the power receivers 202 can be improved.

(Third Adjustment Method)

Note that the controller 307 may measure the local maximum points of the strength of the power wave 202a exceeding a predetermined value in the adjustment mode by changing the orientation of the antenna 305 while moving the power transmitter 201.

In this manner, even if the power transmitter 201 does not have a wireless communication functionality with the power receiver 202, the strength of the power wave 202a transmitted from the power receiver 202 can be measured more precisely. Accordingly, the transmission efficiency of the power wave 201a transmitted from the power transmitter 201 to the power receiver 202 can be further improved.

(Power Receiver 202)

Figure 3:
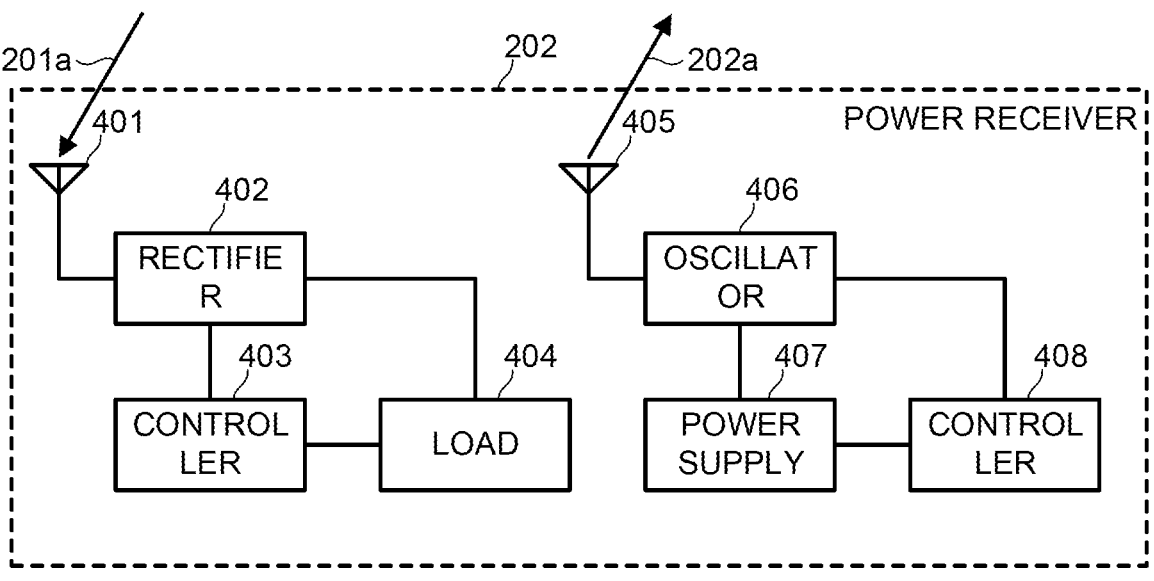
FIG. 3 is a diagram for illustrating an exemplary arrangement of a power receiver 202.

Next, an exemplary arrangement of the power receiver 202 is described with reference to FIG. 3. FIG. 3 is a diagram for illustrating an exemplary arrangement of the power receiver 202.

The power receiver 202 includes an antenna 401, a rectifier 402, a controller 403, a load 404, an antenna 405, an oscillator 406, a power supply 407 and a controller 408.

(Antenna 401)

In the power transmission mode, the antenna 401 receives the power wave 201a transmitted from the power transmitter 201 as illustrated in FIG. 1 and delivers it as high-frequency power to the rectifier 402. The antenna 401 may be a directional antenna, a non-directional antenna or an omni-directional antenna, for example.

(Rectifier 402)

The rectifier 402 may be composed of a rectifier diode, an impedance matching circuitry, a filter circuitry or the like, for example, and convert the high-frequency power delivered from the antenna 401 into direct current power.

(Controller 403)

In the power transmission mode, the controller 403 controls supplying the direct current power fed from the rectifier 402 to the load 404.

(Load 404)

The load 404 may be a sensor for use in IoT, for example. Note that the load is not limited to it.

(Antenna 405)

In the adjustment mode, the antenna 405 emits the high-frequency power generated at the oscillator 403 as the power wave 202*a*. The antenna 405 may be a directional antenna, a non-directional antenna or an omnidirectional antenna, for example.

(Oscillator 406)

The oscillator 406 may include an electric circuitry composed of a quartz oscillator, a phase-locked loop, an amplifier and so on, and use the electric circuitry to generate the high-frequency power. The frequency band of the high-frequency power may be a microwave band such as a 900 MHz band, a 2.45 GHz band or a 5.8 GHz band, for example. These frequency bands may be selected depending on the distance from the power transmitter 201 to the power receiver 202 as illustrated in FIG. 1, the size of the power receiver 202 or the like.

(Power Supply 407)

The power supply 407 is a storage battery that supplies power for operating the power receiver 202. Note that the power supply 407 is not limited to the storage battery but may be a power conversion circuitry that generates direct current power based on commercial alternating power supply or a combination of the battery storage and the power conversion circuitry.

(Controller 408)

The controller 408 may include an electric circuitry such as a memory, a CPU and a communication device, and use the electric circuitry to control an amount of the transmitted high-frequency power, switch between frequency bands of the high-frequency power during the adjustment mode or the like.

(Operation of Wireless Power Transmission System 100)

Figure 4:
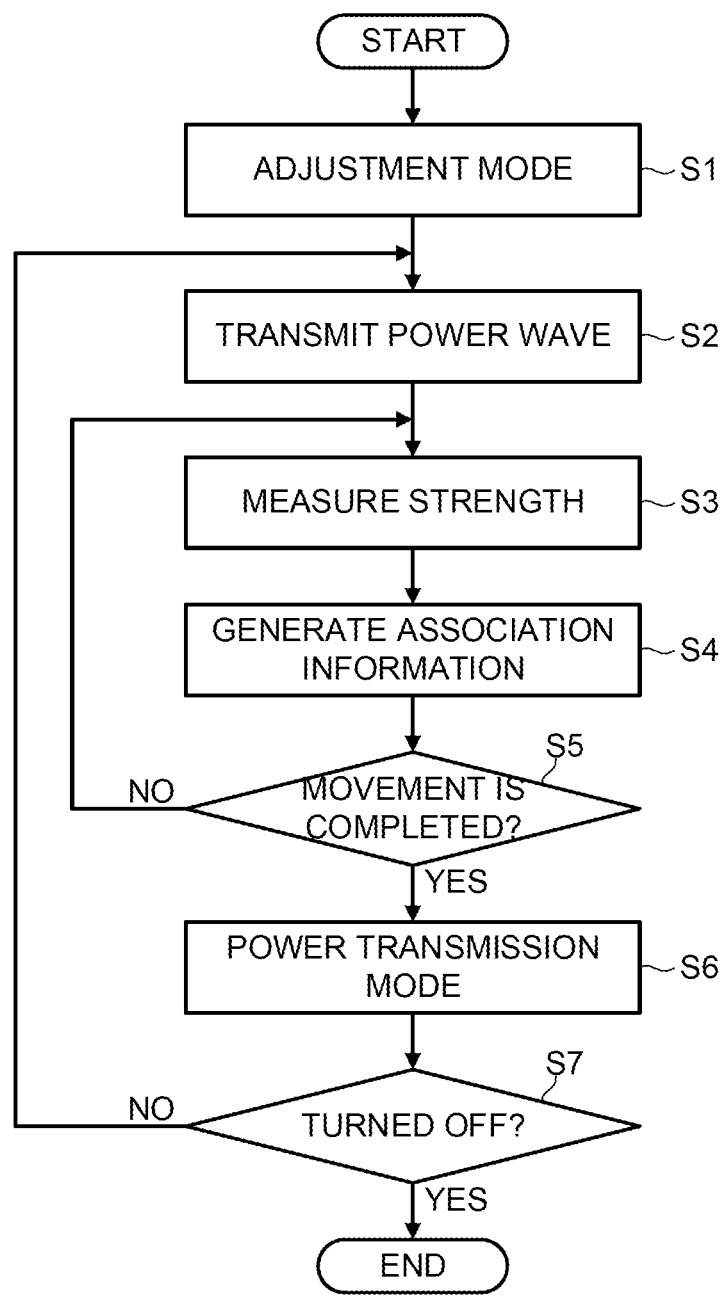
FIG. 4 is a flowchart for illustrating an operation of the wireless power transmission system 100.

Next, an operation of the wireless power transmission system 100 is described with reference to FIG. 4. FIG. 4 is a flowchart for illustrating an operation of the wireless power transmission system 100.

Upon activation of the power transmitter 201 and the power receiver 202, the operation as illustrated in FIG. 4 is initiated.

At step S1, the wireless power transmission system 100 sets the respective operating modes of the power transmitter 201 and the power receiver 202 to the adjustment mode. For example, the operating mode of the power transmitter 201 and the power receiver 202 may be fixed to the adjustment mode until passage of a predetermined period from the activation of the power receiver 202.

Next, the power receiver 202 starts transmission of the power wave 202*a* at step S2, and the power transmitter 201 starts measuring the strength of the power wave 202*a* transmitted from the power receiver 202 at step S3.

Next, at step S4, movement of the power transmitter 201 within a predetermined range, change in the orientation of the antenna 305 or the like are conducted, and the above-stated association information is generated.

Next, at step S5, if the movement of the power transmitter 201 has not been completed (step S5: NO), the processing after the step S3 is repeated until completion of the movement of the power transmitter 201.

If the movement of the power transmitter 201 has been completed (step S5: YES), the wireless power transmission system 100 switches the respective operating modes of the power transmitter 201 and the power receiver 202 from the adjustment mode to the power transmission mode at step S6. In this manner, power can be supplied to a load of the power receiver 202.

Next, at step S7, the wireless power transmission system 100 determines whether each of the power transmitter 201 and the power receiver 202 has been turned off.

If each of the power transmitter 201 and the power receiver 202 has not been turned off (step S7: NO), the processing subsequent to step S2 is repeated.

If each of the power transmitter 201 and the power receiver 202 has been turned off (step S7: YES), the wireless power transmission system 100 finishes these steps.

Note that the power transmitter 201 as illustrated in FIG. 2 may be composed as follows. Other exemplary arrangements of the power transmitter 201 are described with reference to FIGS. 5 and 6.

(Other Exemplary Arrangement 1 of the Power Transmitter 201)

Figure 5:
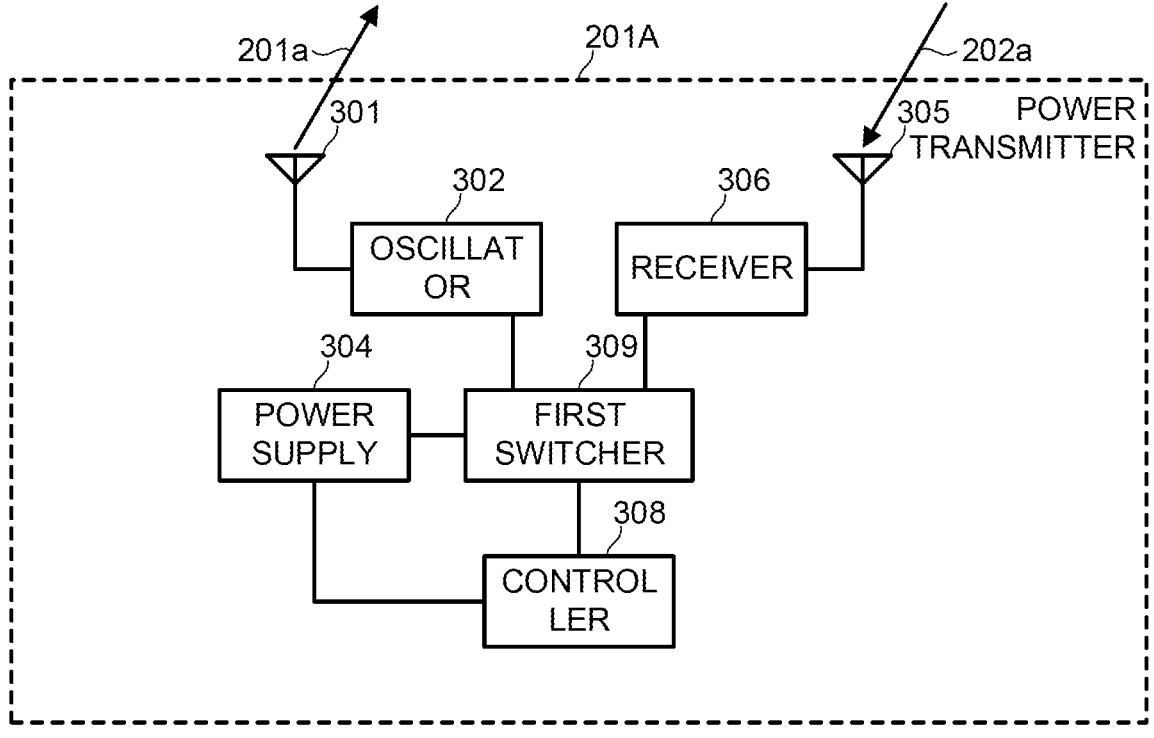
FIG. 5 is a diagram for illustrating an exemplary arrangement of a power transmitter 201A.

FIG. 5 is a diagram for illustrating an exemplary arrangement of a power transmitter 201A. The power transmitter 201A includes an antenna 301, an oscillator 302, a power supply 304, an antenna 305 and a receiver 306.

Also, the power transmitter 201A includes a first switcher 309 and a controller 308, instead of the controller 303 and the controller 307 as illustrated in FIG. 2.

(First Switcher 309)

The first switcher 309 switches a connection target of the controller 308 based on a switching signal transmitted from the controller 308. The first switcher 309 switches between a first state where the power wave 202*a* transmitted from the power receiver 202 in the adjustment mode is received and a second state where if the strength of the power wave measured by the power transmitter 201A exceeds a predetermined value, the power wave 201*a* is transmitted to the power receiver 202.

The switching signal is a signal for switching the connection target of the controller 308 from the receiver 306 to the oscillator 302 or from the oscillator 302 to the receiver 306. The switching signal may be generated at the controller 308, for example.

For example, in the adjustment mode, the switching signal may be generated to switch the connection target of the controller 308 from the oscillator 302 to the receiver 306. As a result, the controller 308 is connected to the receiver 306 via the first switcher 309. In the power transmission mode, the switching signal may be generated to switch the connection target of the controller 308 from the receiver 306 to the oscillator 302. As a result, the controller 308 is connected to the oscillator 302 via the first switcher 309.

(Controller 308)

The controller 308 may include an electric circuitry such as a memory, a CPU and a communication device. The controller 308 generates the switching signal corresponding to any of the power transmission mode and the adjustment mode, and transmits the generated switching signal to the first switcher 309.

In the adjustment mode, the controller 308 generates the association information, similar to the controller 307 as illustrated in FIG. 2. In the power transmission mode, the controller 308 causes the power wave 201*a* to be emitted by adjusting the position of the power transmitter 201A, the orientation of the antenna 301 and/or others, similar to the controller 303 as illustrated in FIG. 2.

According to the power transmitter 201A as illustrated in FIG. 5, it can be controlled corresponding to the power transmission mode and the adjustment mode by means of a reduced number of memories, CPUSs, communication devices or the like.

(Other Exemplary Arrangement 2 of Power Transmitter)

Figure 6:
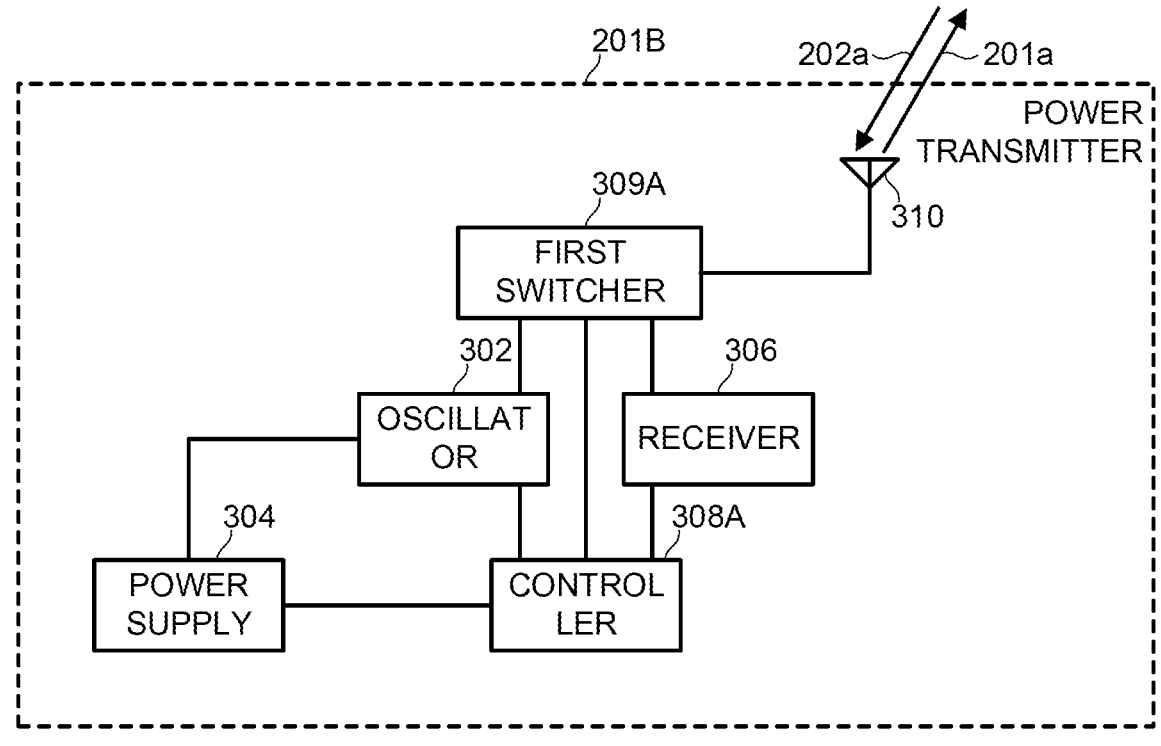
FIG. 6 is a diagram for illustrating an exemplary arrangement of a power transmitter 201B.

FIG. 6 is a diagram for illustrating an exemplary arrangement of a power transmitter 201B. The power transmitter 201B includes an oscillator 302, a power supply 304 and a receiver 306.

Also, the power transmitter 201B includes an antenna 310, a first switcher 309A and a controller 308A, instead of the antenna 301, the controller 303, the antenna 305 and the controller 307 as illustrated in FIG. 2.

(Antenna 310)

The antenna 310 is a transceiver antenna for transmitting the power wave 201*a* and receiving the power wave 202*a*. The antenna 310 may be a directional antenna, a non-directional antenna or an omnidirectional antenna, for example.

High-frequency power generated at the oscillator 302 is emitted as the power wave 201*a* from the antenna 310 in the power transmission mode, and the power wave 202*a* received at the antenna 310 is transmitted as the high-frequency power to the receiver 306.

(First Switcher 309A)

The first switcher 309A switches a connection target of the antenna 310 based on a switching signal transmitted from the controller 308A. The first switcher 309A switches between a first state where the power wave 202*a* transmitted from the power receiver 202 in the adjustment mode is received and a second state where if the strength of the power wave measured by the power transmitter 201B exceeds a predetermined value, the power wave 201*a* is transmitted to the power receiver 202. The switching signal switches the connection target of the antenna 310 from the receiver 206 to the oscillator 302 or from the oscillator 302 to the receiver 306.

For example, the switching signal may be generated in the power transmission mode to switch the connection target of the antenna 310 from the receiver 306 to the oscillator 302. As a result, the antenna 310 is connected to the oscillator 302 via the first switcher 309A. The switching signal may be generated in the adjustment mode to switch the connection target of the antenna 310 from the oscillator 302 to the receiver 306. As a result, the antenna 310 is connected to the receiver 306 via the first switcher 309A.

(Controller 308A)

The controller 308A includes an electric circuitry such as a memory, a CPU, a communication device or the like. The controller 308A generates the switching signal corresponding to any of the power transmission mode and the adjustment mode, and transmits the generated switching signal to the first switcher 309A.

In the adjustment mode, the controller 308A generates the association information, similar to the controller 307 as illustrated in FIG. 2. In the power transmission mode, the controller 308A causes the power wave 201*a* to be emitted by adjusting the position of the power transmitter 201B, the orientation of the antenna 310 and/or others, similar to the controller 303 as illustrated in FIG. 2.

According to the power transmitter 201B as illustrated in FIG. 6, it can be controlled corresponding to the adjustment mode and the power transmission mode by means of a reduced number of memories, CPUs, communication devices or the like. Also, since the power transmitter 201B includes the single antenna 310, the arrangement of the power transmitter 201B can be simplified, and the reliability of the power transmitter 201B can be improved.

Note that the power receiver 202 as illustrated in FIG. 3 may be arranged as follows. Other exemplary arrangements of the power receiver 202 are described with reference to FIGS. 7 and 8.

(Other Exemplary Arrangement 1 of Power Receiver 202)

Figure 7:
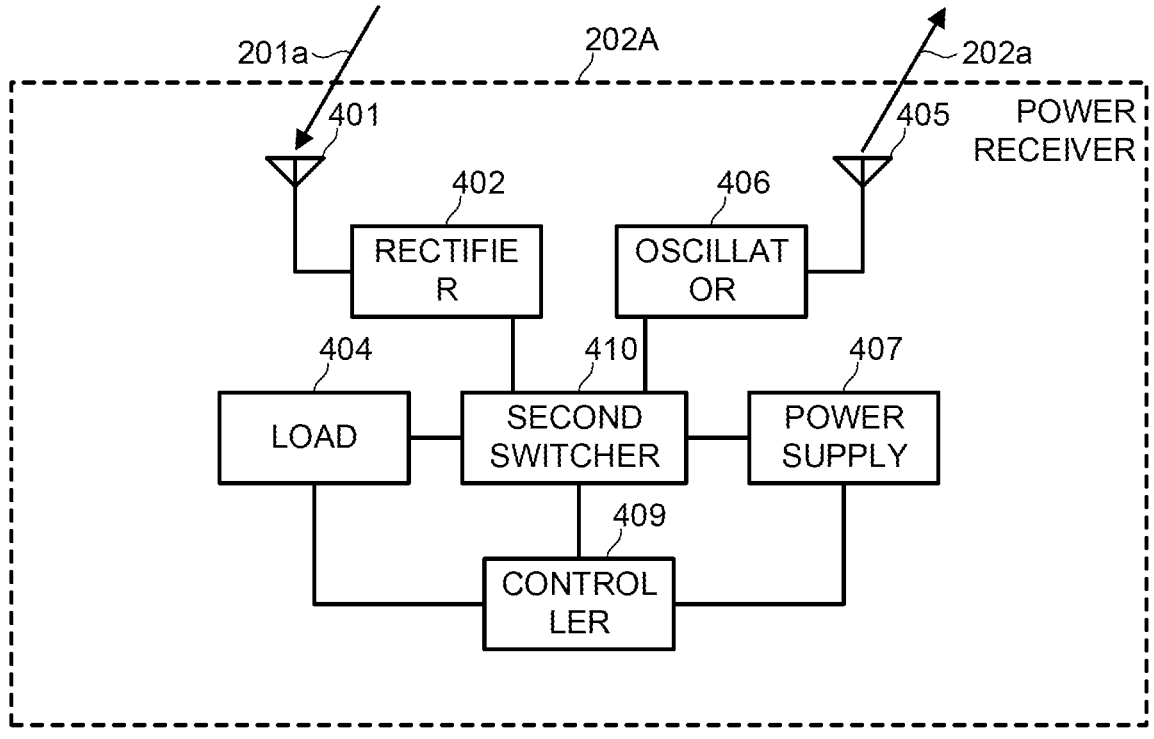
FIG. 7 is a diagram for illustrating an exemplary arrangement of a power receiver 202A.

FIG. 7 is a diagram for illustrating an exemplary arrangement of a power receiver 202A. The power receiver 202A includes an antenna 401, a rectifier 402, a load 404, an antenna 405, an oscillator 406 and a power supply 407.

Also, the power transmitter 201A includes a second switcher 410 and a controller 409, instead of the controller 403 and the controller 408 as illustrated in FIG. 3.

(Second Switcher 410)

The second switcher 410 switches a connection target of the controller 409 based on a switching signal transmitted from the controller 409. The second switcher 410 switches a third state where the power wave 202*a* is transmitted to the power transmitter 201 in the adjustment mode and a fourth state where the power wave 201*a* transmitted from the power transmitter 201 is received. The switching signal switches the connection target of the controller 409 from the rectifier 402 to the oscillator 406 or from the oscillator 406 to the rectifier 402. The switching signal may be generated by the controller 409, for example.

For example, the switching signal may be generated in the adjustment mode to switch the connection target of the controller 409 from the rectifier 402 to the oscillator 406. As a result, the controller 409 is connected to the oscillator 406 via the second switcher 410. The switching signal may be generated in the power transmission mode to switch the connection target of the controller 409 from the oscillator 406 to the rectifier 402. As a result, the controller 409 is connected to the rectifier 402 via the second switcher 410.

(Controller 409)

The controller 409 may include an electric circuitry such as a memory, a CPU and a communication device. The controller 409 generates the switching signal corresponding to any of the power transmission mode and the adjustment mode, and transmits the generated switching signal to the second switcher 410.

The controller 409 causes the power wave 202*a* to be emitted in the adjustment mode by adjusting an amount of transmitted high-frequency power, switching a frequency band of the high-frequency power or the like. The controller 409 controls supplying direct current power fed from the rectifier 402 to the load 404 in the power transmission mode.

According to the power receiver 202A as illustrated in FIG. 7, it can be controlled corresponding to the adjustment mode and the power transmission mode by means of a reduced number of memories, CPUs, communication device or the like.

(Other Exemplary Arrangement 2 of Power Receiver 202)

Figure 8:
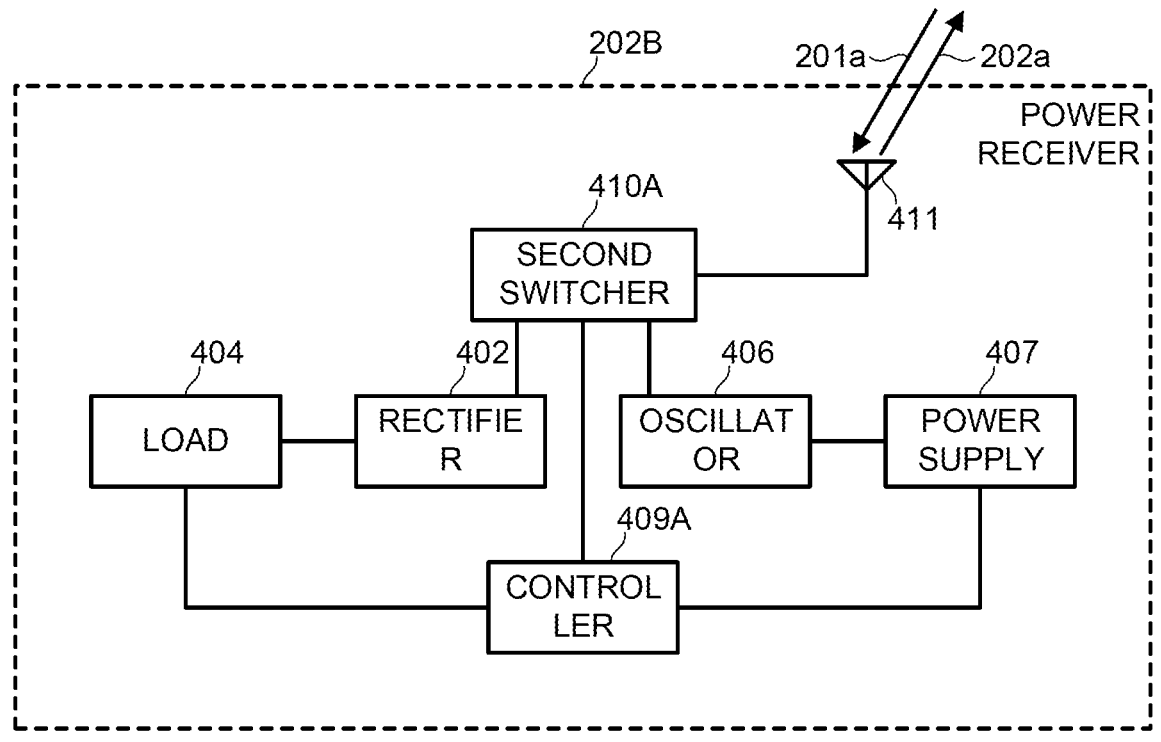
FIG. 8 is a diagram for illustrating an exemplary arrangement of a power receiver 202B.

FIG. 8 is a diagram for illustrating an exemplary arrangement of a power receiver 202B. The power receiver 202B includes a rectifier 402, a load 404, an oscillator 406 and a power supply 407.

Also, the power receiver 202B includes a controller 409A, a second switcher 410A and an antenna 411, instead of the antenna 401, the antenna 405 and the controller 408 as illustrated in FIG. 3.

(Antenna 411)

The antenna 411 is a transceiver antenna for transmitting the power wave 202*a* and receiving the power wave 201*a*.

The antenna 411 may be a directional antenna, a non-directional antenna or an omnidirectional antenna, for example.

In the power transmission mode, the power wave 201a received at the antenna 411 is delivered to the rectifier 402 as high-frequency power. In the adjustment mode, the high-frequency power generated at the oscillator 406 is emitted from the antenna 411 as the power wave 202a.

(Second Switcher 410A)

The second switcher 410A switches a connection target of the antenna 411 based on a switching signal transmitted from the controller 409A. The second switcher 410A switches a third state where the power wave 202a is transmitted to the power transmitter 201 in the adjustment mode and a fourth state where the power wave 201a transmitted from the power transmitter 201 is received. The switching signal switches the connection target of the antenna 411 from the rectifier 402 to the oscillator 406 or from the oscillator 406 to the rectifier 402. The switching signal may be generated by the controller 409A, for example.

For example, the switching signal is generated in the adjustment mode to switch the connection target of the antenna 411 from the rectifier 402 to the oscillator 406. As a result, the antenna 411 is connected to the oscillator 406 via the second switcher 410A. The switching signal is generated in the power transmission mode to switch the connection target of the antenna 411 from the oscillator to the rectifier 402. As a result, the antenna 411 is connected to the rectifier 402 via the second switcher 410A.

(Controller 409A)

The controller 409A may include an electric circuitry such as a memory, a CPU and a communication device. The controller 409A generates the switching signal corresponding to any of the power transmission mode and the adjustment mode, and delivers the generated switching signal to the second switcher 410A.

In the adjustment mode, the controller 409A causes the power wave 202a to be emitted by controlling an amount of transmitted high-frequency power, switching a frequency band of the high-frequency power or the like. In the power transmission mode, the controller 409A controls supplying direct current power fed from the rectifier 402 to the load 404.

According to the power receiver 202B as illustrated in FIG. 8, it can be controlled corresponding to the adjustment mode and the power transmission mode by means of a reduced number of memories, CPUs, communication devices or the like. Also, since the power receiver 202B includes the single antenna 411, the arrangement of the power receiver 202B can be simplified, and the reliability of the power receiver 202B can be improved.

Note that if the strength of the power wave 202a is measured in accordance with the above first, second or third adjustment method between the power transmitter 201 and the plurality of power receivers 202, the wireless power transmission system 100 may be arranged as follows.

(Other Exemplary Arrangement 1 of Wireless Power Transmission System 100)

In the adjustment mode, the wireless power transmission system 100 may transmit the power wave 202a at a regular time interval in accordance with a predetermined order of the plurality of power receivers 202, and the power transmitter 201 may measure the strength of the power wave 202a at a regular time interval in accordance with the predetermined order.

Specifically, in the adjustment mode, a first power receiver of the plurality of power receivers 202 transmits the power wave 202a from a first time instance to a second time instance, which is the time instance after passage of a certain period from the first time instance. In this case, the power receivers other than the first power receiver halt transmission of the power wave 202a. The first power receiver is an arbitrary one of the plurality of power receivers 202.

When the second time instance passes, a second power receiver of the plurality of power receivers 202 transmits the power wave 202a from the second time instance to a third time instance, which is the time instance after passage of a certain period, in the adjustment mode. In this case, power receivers other than the second power receivers halt transmission of the power wave 202a. The second power receiver is an arbitrary one of the plurality power receivers 202 other than the first power receiver.

In the adjustment mode, the power transmitter 201 measures the strength of a power wave transmitted from the first power receiver by adjusting at least one of the position of the power transmitter and the orientation of an antenna receiving the power wave transmitted from the first power receiver.

Then, the power transmitter 201 stores data indicative of the position of the power transmitter 201 and the orientation of the antenna when the measured strength of a power wave exceeds a predetermined value.

Also, in the adjustment mode, the power transmitter 201 measures the strength of a power wave transmitted from the second power receiver by adjusting at least one of the position of the power transmitter and the orientation of the antenna receiving the power wave transmitted from the second power receiver.

Then, the power transmitter 201 stores data indicative of the position of the power transmitter 201 and the orientation of the antenna when the measured strength of a power wave exceeds a predetermined value.

In the power transmission mode, the power transmitter 201 transmits a power wave to the first power receiver for a certain period based on the stored data in accordance with at least one of the position of the power transmitter 201 and the orientation of the antenna when the strength of the power wave transmitted from the first power receiver exceeds a predetermined value.

Also, in the power transmission mode, the power transmitter 201 transmits a power wave to the second power receiver for a certain period based on the stored data in accordance with at least one of the position of the power transmitter 201 and the orientation of the antenna when the strength of the power wave transmitted from the second power receiver exceeds a predetermined value.

According to the wireless power transmission system 100 of another exemplary arrangement 1, in the case of the adjustment mode, each of power receivers transmits power waves at a regular time interval in accordance with a predetermined order, and the controller measures the strength of the power waves transmitted from the respective power receivers at a regular time interval and transmits power waves to the power receivers in accordance with at least one of the position of the power transmitter and the orientation of the antenna when the measured strength of the power waves corresponding to the respective power receivers exceeds a predetermined value.

According to this arrangement, even if the wireless power transmission system 100 includes the plurality of power receivers, the transmission efficiency of the power wave 201a transmitted from the single power transmitter 201 to the respective power receivers 202 can be improved.

(Other Exemplary Arrangement 2 of Wireless Power Transmission System 100)

According to the wireless power transmission system 100, if a first power receiver of the plurality of power receivers 202 transmits the power wave 202*a* in the adjustment mode, the power transmitter 201 may transmit the power wave 201*a* in the power transmission mode by measuring the strength of the power wave 202*a*.

In this case, power is supplied to a load by operating the second power receiver of the power receivers 202 other than the first power receiver in the power transmission mode.

According to the wireless power transmission system 100 of another exemplary arrangement 2, if the first power receiver of the plurality of power receivers transmits a power wave to a power transmitter, the second power receiver other than the first power receiver receives the power wave transmitted from the power transmitter, and if the second power receiver transmits a power wave to the power transmitter, the first power receiver receives a power wave transmitted from the power transmitter.

According to this arrangement, a similar effect to the wireless power transmission system of the exemplary arrangement 1 can be obtained. Also, the adjustment mode and the power transmission mode can be performed together, and even if the power receiver 202 has a storage battery having a relatively small capacity as the power supply 407, power can be continuously supplied to a load.

As stated above, the wireless power transmission system 100 according to the embodiments of the present disclosure includes a power transmitter that transmits a power wave and one or more power receivers that receive the power wave, wherein the power transmitter includes a controller that measures a strength of a power wave transmitted from the power receivers by adjusting at least one of a position of the power transmitter and an orientation of an antenna receiving the power wave transmitted from the power receivers, and transmits a power wave to the power receivers in accordance with at least one of the position of the power transmitter and the orientation of the antenna upon the measured strength of the power wave exceeding a predetermined value.

According to this arrangement, even if the power transmitter does not have a communication functionality, the transmission efficiency of power waves transmitted from the power transmitter can be improved.

Also, even if the power receiver 202 is added, the position of the power transmitter 201, the orientation of an antenna or the like can be automatically adjusted to improve the transmission efficiency of the power wave 201*a* transmitted to the respective power receivers 202.

Also, even if the installation positions of the one or more power receivers 202 are changed, the position of the power transmitter 201, the orientation of an antenna or the like can be automatically adjusted to improve the transmission efficiency of the power wave 201*a* transmitted from the power transmitter 201 to the power receivers 202.

Accordingly, the position of the power transmitter 201 or the like may not be necessarily adjusted for addition of the power receiver 202, change in the installation position or the like. Also, since the specification of the antenna 301 or the like provided in the power transmitter 201 may not be necessarily changed, the design cost, the fabrication cost or the like involved in the specification change of the power transmitter 201 can be reduced.

Also, since the transmission efficiency of the power wave 201*a* can be improved without enhancement of the power strength of the power wave 202*a*, the specification of the power transmitter 201 can be simplified, and a device, a person or the like existing around the power transmitter 201 can be less influenced.

It is to be understood that aspects as set forth also belong to the technical scope of the present disclosure.

(1) A wireless power transmission system includes a power transmitter that transmits a power wave, and one or more power receivers that receive the power wave, and the power transmitter includes a controller that measures a strength of a power wave transmitted from the power receivers by adjusting at least one of a position of the power transmitter and an orientation of an antenna receiving the power wave transmitted from the power receivers and transmits a power wave to the power receivers in accordance with at least one of the position of the power transmitter and the orientation of the antenna upon the measured strength of the power wave exceeding a predetermined value.

(2) The power transmitter further includes a first switcher that switches between a first state where the power wave transmitted from the power receivers is received and a second state where upon the measured strength of the power wave exceeding a predetermined value, a power wave is transmitted to the power receivers.

(3) The power receiver further includes a second switcher that switches between a third state where a power wave is transmitted to the power transmitter and a fourth state where a power wave transmitted from the power transmitter is received.

(4) When a first power receiver and a second power receiver of the power receivers transmit power waves at a certain time interval in accordance with a predetermined order, the controller measures the strength of the power wave transmitted from the first power receivers for a certain period to transmit the power wave to the first power receivers in accordance with at least one of the position of the power transmitter and the orientation of the antenna upon the measured strength of the power wave exceeding the predetermined value, and measures the strength of the power wave transmitted from the second power receiver for a certain period after completion of measurement of the strength of the power wave transmitted from the first power receiver to transmit the power wave to the second power receiver in accordance with at least one of the position of the power transmitter and the orientation of the antenna upon the measured strength of the power wave exceeding the predetermined value.

(5) When the first power receiver transmits the power wave to the power transmitter, the second power receiver receives the power wave transmitted from the power transmitter, and when the second power receiver transmits the power wave to the power transmitter, the first power receiver receives the power wave transmitted from the power transmitter.

(6) A wireless power transmission method includes upon receiving a power wave transmitted from one or more power receivers, measuring, by a power transmitter, a strength of the power wave transmitted from the power receivers by adjusting at least one of a position of the power transmitter and an orientation of an antenna receiving the power wave transmitted from the power receivers, and upon measuring the strength of the power wave, transmitting, by the power transmitter, a power wave to the power receivers in accordance with at least one of the position of the power transmitter and the orientation of the antenna upon the measured strength of the power wave exceeding a predetermined value.

(7) The wireless power transmission method further includes when a first power receiver and a second power receiver of the power receivers transmit power waves at a certain time interval in accordance with a predetermined order, measuring the strength of the power wave transmitted from the first power receivers for a certain period to transmit the power wave to the first power receivers in accordance with at least one of the position of the power transmitter and the orientation of the antenna upon the measured strength of the power wave exceeding the predetermined value, and measuring the strength of the power wave transmitted from the second power receiver for a certain period after completion of measurement of the strength of the power wave transmitted from the first power receiver to transmit the power wave to the second power receiver in accordance with at least one of the position of the power transmitter and the orientation of the antenna upon the measured strength of the power wave exceeding the predetermined value.

(8) The wireless power transmission method further includes when a first power receiver of the power receivers transmits the power wave to the power transmitter, receiving, by a second power receiver of the power receivers, the power wave transmitted from the power transmitter; and when the second power receiver transmits the power wave to the power transmitter, receiving, by the first power receiver, the power wave transmitted from the power transmitter.

Although various embodiments have been described above with reference to the drawings, the present disclosure is not limited to the embodiments. Various changes or modifications falling within the scope disclosed in the present disclosure are obviously conceivable to those skilled in the art, and it is to be understood that they also belong to the technical scope of the present disclosure. Also, components in the above embodiments may be arbitrarily combined without deviating from the spirit of the present disclosure.

Although specific examples of the present disclosure have been described in detail above, they are merely illustrative and do not limit the scope of claims. Techniques recited in the claims may include various changes and modifications of the examples of the present disclosure.

INDUSTRIAL APPLICABILITY

One embodiment of the present disclosure is suitable for a wireless power transmission system and a wireless power transmission method.

The invention claimed is:

1. A wireless power transmission system, comprising:
a power transmitter configured to transmit a first power wave in a power transmission mode and receive a second power wave in an adjustment mode; and
at least one power receiver comprising a power supply and an oscillator configured to generated the second power wave, the least one power receiver configured to receive the first power wave in the power transmission mode and transmit the second power wave in the adjustment mode,
wherein the power transmitter includes a controller configured to:

in the adjustment mode, measure a strength of the second power wave transmitted from the at least one power receiver while adjusting at least one of a position of the power transmitter and an orientation of an antenna receiving the second power wave transmitted from the at least one power receiver, and
in the power transmission mode, transmit the first power wave to the at least one power receiver in accordance with at least one of the position of the power transmitter and the orientation of the antenna upon the measured strength of the second power wave exceeding a predetermined value.

2. The wireless power transmission system as claimed in claim 1, wherein the power transmitter further includes a first switcher configured to switch between a first state in the adjustment mode and a second state in the power transmission mode.

3. The wireless power transmission system as claimed in claim 1, wherein the at least one power receiver further includes a second switcher configured to switch between a third state where the second power wave is transmitted to the power transmitter and a fourth state where the first power wave transmitted from the power transmitter is received.

4. The wireless power transmission system as claimed in claim 1, wherein the at least one power receiver includes a first power receiver and a second power receiver,
the first power receiver and the second power receiver are configured to transmit second power waves at a certain time interval in accordance with a predetermined order,
the controller is configured to:
measure the strength of the second power wave transmitted from the first power receiver for a certain period to transmit the first power wave to the first power receiver in accordance with at least one of the position of the power transmitter and the orientation of the antenna upon the measured strength of the second power wave exceeding the predetermined value, and
measure the strength of the second power wave transmitted from the second power receiver for a certain period after completion of measurement of the strength of the second power wave transmitted from the first power receiver to transmit the first power wave to the second power receiver in accordance with at least one of the position of the power transmitter and the orientation of the antenna upon the measured strength of the second power wave exceeding the predetermined value.

5. The wireless power transmission system as claimed in claim 1, wherein the at least one power receiver includes a first power receiver and a second power receiver,
when the first power receiver transmits the second power wave to the power transmitter, the second power receiver is configured to receive the first power wave transmitted from the power transmitter, and
when the second power receiver transmits the second power wave to the power transmitter, the first power receiver is configured to receive the first power wave transmitted from the power transmitter.

6. The wireless power transmission system as claimed in claim 1, wherein, in the adjustment mode, the power transmitter is configured to autonomously measure a strength of a second power wave transmitted from the at least one power receiver.

7. The wireless power transmission system as claimed in claim 1, wherein the adjustment mode is set in response to a power-on of the at least one power receiver.

8. The wireless power transmission system as claimed in claim 1, wherein the adjustment mode is set for a predetermined period starting from a time when power to the at least one power receiver is turned on.

9. The wireless power transmission system as claimed in claim 1, wherein the oscillator is configured to generate high-frequency power in a microwave band.

10. The wireless power transmission system as claimed in claim 1, wherein the second power wave is in a frequency band selected from 900 MHz band, 2.45 GHz band, or 5.8 GHz band.

11. The wireless power transmission system as claimed in claim 1, wherein a frequency band of the second power wave is selected based on at least one of a distance from the at least one power receiver to the power transmitter and a size of the at least one power receiver.

12. The wireless power transmission system as claimed in claim 1, wherein the power transmitter includes a transceiver antenna configured to both transmit the first power wave and receive the second power wave.

13. The wireless power transmission system as claimed in claim 1, wherein the controller is configured to adjust both the position of the power transmitter and the orientation of the antenna simultaneously.

14. The wireless power transmission system as claimed in claim 1, wherein the at least one power receiver further includes a controller configured to control at least one of a transmission amount of the second power wave and a frequency band of the second power wave in the adjustment mode.

15. A wireless power transmission method, comprising:
transmitting a first power wave in a power transmission mode by using a power transmitter;
receiving a second power wave in an adjustment mode by using the power transmitter;
receiving the first power wave in the power transmission mode by using at least one power receiver;
transmitting the second power wave in the adjustment mode by using the at least one power receiver;
in the adjustment mode, by using the power transmitter receiving the second power wave transmitted from the at least one power receiver, measuring a strength of the second power wave transmitted from the power receivers while adjusting at least one of a position of the power transmitter and an orientation of an antenna receiving the second power wave transmitted from the power receivers; and
in the power transmission mode, by using the power transmitter measuring the strength of the second power wave, transmitting the first power wave to the power receivers in accordance with at least one of the position of the second power transmitter and the orientation of the antenna upon the measured strength of the second power wave exceeding a predetermined value,
wherein the least one power receiver comprises a power supply and an oscillator configured to generate the second power wave.

16. The wireless power transmission method as claimed in claim 15, further comprising:
transmitting, by using a first power receiver and a second power receiver of the at least one power receiver, the second power wave at a certain time interval in accordance with a predetermined order;
measuring the strength of the second power wave transmitted from the first power receivers for a certain period to transmit the first power wave to the first power receivers in accordance with at least one of the position of the power transmitter and the orientation of the antenna upon the measured strength of the second power wave exceeding the predetermined value; and
measuring the strength of the second power wave transmitted from the second power receiver for a certain period after completion of measurement of the strength of the second power wave transmitted from the first power receiver to transmit the first power wave to the second power receiver in accordance with at least one of the position of the power transmitter and the orientation of the antenna upon the measured strength of the second power wave exceeding the predetermined value.

17. The wireless power transmission method as claimed in claim 15, further comprising:
transmitting, by using a first power receiver of the at least one power receiver, the second power wave to the power transmitter,
receiving, by using a second power receiver of the at least one power receiver, the first power wave transmitted from the power transmitter; and
transmitting, by using the second power receiver, the second power wave to the power transmitter, receiving, by the first power receiver, the first power wave transmitted from the power transmitter.

* * * * *